United States Patent [19]

Fletcher et al.

[11] 3,745,255

[45] July 10, 1973

[54] RECEIVER WITH AN IMPROVED PHASE LOCK LOOP IN A MULTICHANNEL TELEMETRY SYSTEM WITH SUPPRESSED CARRIER

[76] Inventors: James C. Fletcher, Administrator of the National Aeronautics and Space Administration with respect to an invention of; Stanley Butman; Uzi Timor, both of Pasadena, Calif.

[22] Filed: Aug. 18, 1971

[21] Appl. No.: 172,807

[52] U.S. Cl. .............. 179/15 FS, 329/122, 325/419

[51] Int. Cl. .............................................. H04j 1/20

[58] Field of Search .................... 179/15 BC, 15 FS; 329/50, 122, 123, 124, 125

[56] References Cited

UNITED STATES PATENTS

| | | | |
|---|---|---|---|
| 3,675,131 | 7/1972 | Pickholtz | 329/50 |
| 3,101,448 | 8/1963 | Costas | 329/50 |
| 3,384,824 | 5/1968 | Grenier | 179/15 BC |

*Primary Examiner*—Kathleen H. Claffy
*Assistant Examiner*—David L. Stewart
*Attorney*—Monte F. Mott and John R. Manning

[57] ABSTRACT

A phase lock loop is disclosed for a receiver in a two-channel PSK/PM telemetry system with a suppressed carrier. The receiver inphase channel output is filtered by first and second bandpass filters and the receiver quadrature channel output is filtered by third and fourth bandpass filters. The first and third filters have the same bandwidth, centered about the frequency of one subcarrier and is wide enough to pass data around the first harmonic of the subcarrier. The second and fourth bandpass filters have the same bandwidth centered about the frequency of the other subcarrier and is wide enough to pass data around the first harmonic of this subcarrier. The outputs of the first and third filters are mixed in one mixer and the outputs of the second and fourth filters are mixed in another mixer. The outputs of the two mixers are weighted to produce a weighted sum signal which is supplied to the loop filter.

11 Claims, 2 Drawing Figures

RECEIVER WITH AN IMPROVED PHASE LOCK LOOP IN A MULTICHANNEL TELEMETRY SYSTEM WITH SUPPRESSED CARRIER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention generally relates to a receiver with a phase-locked loop for tracking carrier signals and, more particularly, to an improved receiver in a PSK/PM multichannel telemetry system, operable in a suppressed carrier mode.

2. Description of the Prior Art

As is appreciated by those familiar with telemetry systems maximum power efficiency is attainable when the carrier is fully suppressed. As is further appreciated when a signal with a suppressed carrier is received by the telemetry system's receiver, typically with a phase-locked loop (PLL), since there is no unmodulated carrier power which the loop can use to achieve lock, some arrangement must be provided to enable the loop to achieve phase lock. Herebefore, several such arrangements have been proposed and designed. These include Costas or squaring loops which are well known.

Herebefore the suppressed carrier mode has been employed only in single channel phase shift keying phase modulation (PSK/PM) telemetry systems. This is due to the fact that in prior art multichannel PSK/PM telemetry systems, if the carrier is suppressed, the intermodulation losses become intolerably large, thereby lowering system efficiency to unacceptable low levels. Recently several embodiments of a multichannel PSK/PM telemetry system have been invented. These embodiments are described and claimed in U. S. Pat. Application Ser. No. 125,234, field Mar. 17, 1971 now U.S. Pat. No. 3,710,257, issued Jan. 9, 1973, by the applicants of the present application and assigned to a common assignee. In the system described in the above-identified application, the carrier can be suppressed without increasing intermodulation losses. In fact, when operated in a suppressed carrier mode, losses are eliminated.

Analysis of existing arrangements such as Costas and squaring loops to achieve lock in these multichannel PSK/PM systems indicates that the usefulness of these arrangements is quite limited for several reasons. Firstly, the loop signal-to-noise ratio (SNR) is quite low and secondly, they are dependent on the ratio of the powers of the various (e.g., 2) channels which must be large. These arrangements become useless as the powers' ratio approaches unity. Thus a need exists for a new receiver for a multichannel PSK/PM telemetry system operable with a suppressed carrier which is independent of channel power ratio and one which can lock to the received signal even when the powers of the various channels are equal. Also, a need exists for an arrangement in a receiver for a multichannel PSK/PM telemetry system operable with suppressed carrier which exhibits higher loop SNR than that achievable with prior art arrangements such as Costas loops and the like.

Hereafter when describing the telemetry system in which the present invention is particularly useful and provides advantages over the prior art, it will be assumed that the system is of the PSK/PM type whether or not this is explicitly stated.

OBJECTS AND SUMMARY OF THE INVENTION

A primary object of the present invention is to provide a new improved PLL receiver for a multichannel PSK/PM telemetry system.

Another object is to provide a new PLL receiver for a multichannel PSK/PM telemetry system operable with a suppressed carrier.

A further object is the provision of a new improved PLL receiver which is part of a multichannel PSK/PM telemetry system, operable with a suppressed carrier, and which is independent of the ratio of powers of the various channels.

These and other objects of the present invention are achieved by providing a PLL receiver which includes a novel arrangement, in addition to the elements included in a conventional PLL receiver. In the novel PLL receiver of the present invention for use in a two-channel telemetry system, the receiver's in-phase channel output is fed to a first pair of bandpass filters. Similarly the receiver's quadrature channel output is fed to a second pair of bandpass filters. The outputs of corresponding filters of the two filter pairs are combined to produce first and second control signals. These are in turn combined to produce a single control signal which controls the loop's filter whose output controls the loop's voltage controlled oscillator (VCO) to achieve lock as in a conventional PLL.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2:
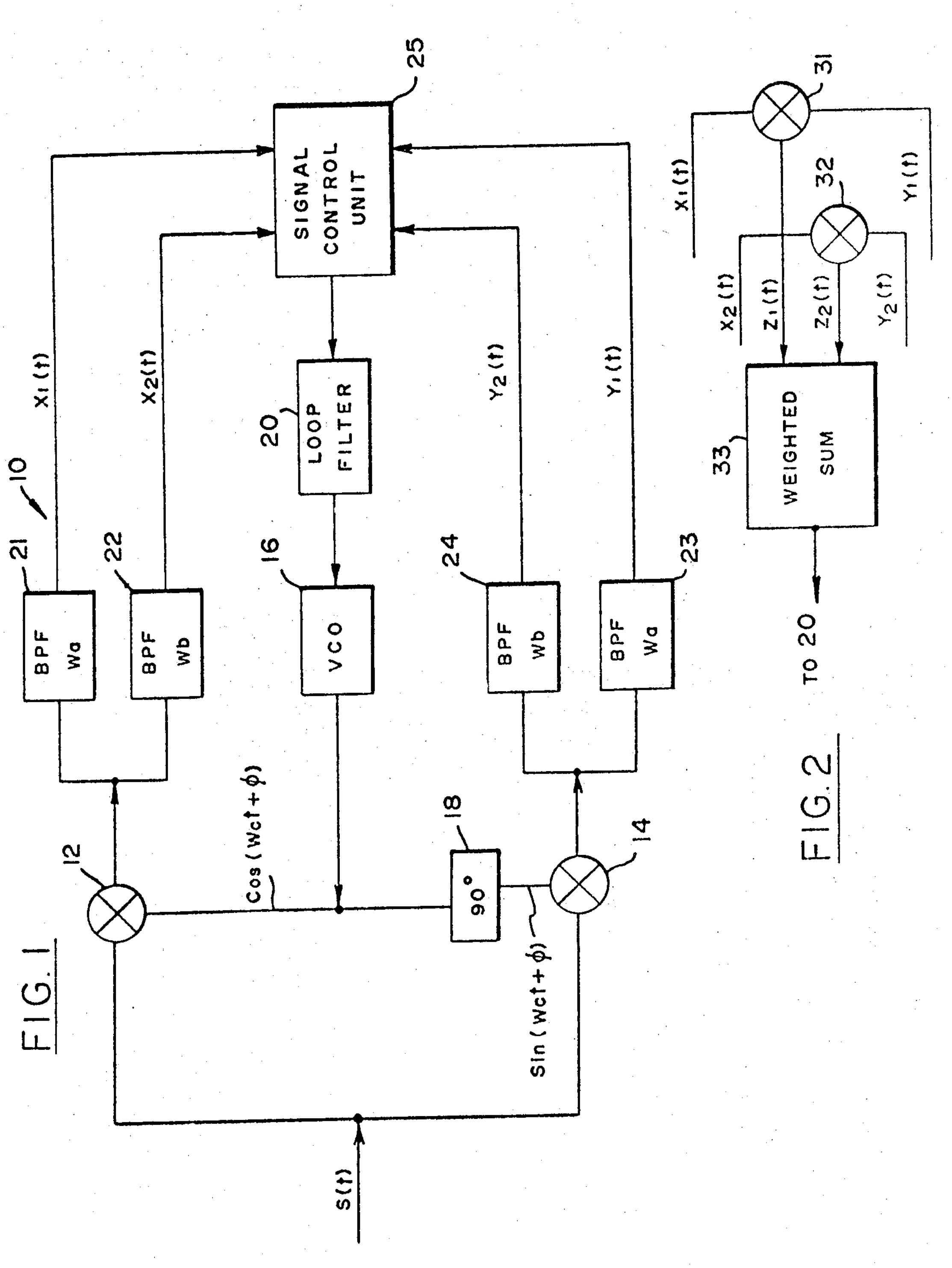
FIG. 1 is a block diagram of the novel receiver of the present invention.
FIG. 2 is one embodiment of a signal control unit, shown in FIG. 1.

As seen from FIG. 1, the novel receiver of the present invention, designated by numeral 10, includes several elements which are identical to those found in a conventional PLL receiver. Receiver 10 is assumed to be part of a two-channel PSK/PM telemetry system which includes a transmitter (not shown) in which data of each of the two channels phase modulates a separate channel squarewave subcarrier and the phase modulated subcarriers in turn phase modulate a carrier. For explanatory purposes the frequencies of the subcarriers are assumed to be $\omega_1$ and $\omega_2$.

In FIG. 1 the received input signal $s(t)$ is shown supplied to two mixers 12 and 14. Mixer 12 mixes the input signal with the output of a voltage-controlled oscillator (VCO) 16, to provide an in-phase receiver channel output while mixer 14 mixes the same input signal with the VCO's output, after the latter is phase shifted by 90° by phase shifter 18, to provide a quadrature receiver channel output. The VCO is controlled by the output of a loop filter 20.

The elements so far described are identical with those found in any conventional PLL recever. In such a receiver which forms part of a telemetry system operable with an unsuppressed carrier, the inphase receiver channel output, i.e., the output of mixer 12 is connected to the input of the loop filter 20. In prior art single channel systems with suppressed carrier using the Costas loop, the receiver includes two lowpass filters which filter the in-phase and quadrature receiver channel outputs. The outputs of these filters are multiplied and the product is used to control the loop filter 20.

Unlike such prior art arrangements, novel receiver 10 includes a first pair of filters which consists of filters 21 and 22 and a second pair of filters which consists of filters 23 and 24. Filters 21 and 22 filter the in-phase receiver channel output and filters 23 and 24 do the same to the quadrature receiver channel output. The outputs of the four filters 21–24 are combined in a signal control unit 25, in manners to be described hereafter, to produce a single control signal which is supplied to the loop filter 20. The bandwidth of each of filters 21 and 24 designated $W_a$, is centered about the frequency $\omega_1$ of one of the subcarriers and the bandwidth of each of filters 22 and 23 designated $W_b$ is centered about the frequency $\omega_2$ of the other subcarrier. The bandwidths are wide enough to pass the data around the first harmonics of the subcarriers at frequencies $\omega_1$ and $\omega_2$. As will become apparent from an analysis of the operation of receiver 10 which will be presented hereafter, the receiver is capable of providing lock for an input signal with a plurality of data modulated subcarrier channels with suppressed carrier, while being independent of the ratio of the powers in the various channels.

Before proceeding to present the operation analysis of the receiver 10, reference is first made to FIG. 2 which is one embodiment of signal control unit 25. As seen the outputs of the four filters 21–24 respectively, designated $x_1(t)$, $x_2(t)$, $Y_1(t)$ and $y_2(t)$ are supplied to two mixers 31 and 32. Mixer 31 mixes $x_1(t)$ and $y_1(t)$ and provides an output $z_1(t)$ while mixer 32 mixes $x_2(t)$ and $y_2(t)$ and provides an output $z_2(t)$. Both $z_1(t)$ and $z_2(t)$ are summed by a weighted summer 33 whose output $z(t)$ is the control signal which is supplied to the loop filter 30.

The operation of the novel receiver 10 will now be analysed. Let $a(t) = \hat{a}(t)\text{sq}(\omega_1 t)$ and $b(t) = \hat{b}(t)\text{sq}(\omega_2 t)$ be square-wave subcarriers of frequencies $\omega_1$ and $\omega_2$, modulated by binary data streams $a(t)$ and $b(t)$ respectively. The suppressed-carrier transmitted waveform is $$s(t) = \sqrt{2P_T}\sin(\omega_c t + \pi/2\,a(t) + \theta a(t)b(t)) = \sqrt{2P_T}a(t)\cos(\omega_c t + \theta a(t)b(t)) , \qquad (1)$$

where $P_T$ is the transmitted power, $\omega_c$ is the carrier frequency and $\theta$ is determined by the required ratio of the powers in the data channels:

$$\tan^2\theta = P_2/P_1 = \alpha \text{ for } 0 \le \alpha \le 1 \qquad (2)$$

$P_1$ and $P_2$ are the powers in the two channels. The receiver 10 correlates $s(t)$ with local reference $\cos(\omega_c t + \phi)$ from VCO 16 in mixer 12 and its quadrature $\sin(\omega_c t + \phi)$ in mixer 14 to yield, $$x'(t) = \sqrt{P_T}a(t)\cos(\phi - \theta a(t)b(t)) + \text{terms of } (2\omega_c)$$
$$y'(t) = \sqrt{P_T}a(t)\sin(\phi - \theta a(t)b(t)) + \text{terms of } (2\omega_c). \qquad (3)$$

In practice the terms above $\omega_c$ are filtered out by simple filters so that the outputs of mixers 12 and 14 can be expressed as:

$$x(t) = \sqrt{P_T}a(t)\cos(\phi - \theta a(t)\,b(t))$$
$$y(t) = \sqrt{P_T}a(t)\sin(\phi - \theta a(t)\,b(t)) . \qquad (4)$$

$x(t)$ and $y(t)$ can be rewritten as $$x(t) = \sqrt{P_T}[a(t)\cos\phi\cos\theta + b(t)\sin\phi\sin\theta]$$
$$y(t) = \sqrt{P_T}[a(t)\sin\phi\cos\theta - b(t)\cos\phi\sin\theta] . \qquad (5)$$

Since $a(t)$ and $b(t)$ are modulated subcarriers of different frequencies, bandpass filters centered at $\omega_1$ and $\omega_2$ can be used to separate them. This is accomplished by filters 21–24. Filters 21 and 23 have a bandwidth $W_a$ and filters 22 and 24 a bandwidth $W_b$. $W_a$ and $W_b$ centered about $\omega_1$ and $\omega_2$ respectively are chosen to pass the data around the first harmonic of the subcarrier. The outputs of the four filters may be expressed as $$x_1(t) = \sqrt{P_T}(\cos\phi\cdot\cos\theta)\,\hat{a}(t)\cos(\omega_1 t+\phi_a)$$
$$x_2(t) = \sqrt{P_T}(\sin\phi\cdot\sin\theta)\,\hat{b}(t)\cos(\omega_2 t+\phi_b)$$
$$y_1(t) = \sqrt{P_T}(\sin\phi\cdot\cos\theta)\,\hat{a}(t)\cos(\omega_1 t+\phi_a)$$
$$y_2(t) = \sqrt{P_T}(\cos\phi\cdot\sin\theta)\,\hat{b}(t)\cos(\omega_2 t+\phi_b) \qquad (6)$$

When $x_1(t)$ and $y_1(t)$ are combined such as by mixer 31 and $x_2(t)$ and $y_2(t)$ are combined such as by mixer 32 one obtains $$\tilde{z}_1'(t) = x_1(t)y_1(t) = \tfrac{1}{4}P_T\cos^2\theta\sin 2\phi + \text{terms of } \cos(2\omega_1 t)$$
$$\tilde{z}_2'(t) = x_2(t)y_2(t) = \tfrac{1}{4}P_T\sin^2\theta\sin 2\phi + \text{terms of } \sin(2\omega_2 t) \qquad (7)$$

The second terms can be filtered out by lowpass filters. However, in practice the filtering is achieved by the loop filter 20. Thus the outputs of mixers 31 and 32 can be expressed simply as $$\tilde{z}_1(t) = \tfrac{1}{4}P_T\cos^2\theta\sin 2\phi$$
$$\tilde{z}_2(t) = \tfrac{1}{4}P_T\sin^2\theta\sin 2\phi. \qquad (7')$$

By combining these two control signals in unit 33 to produce the output control signal $\tilde{z}(t)$ which is supplied to the loop filter 20, the $\theta$ terms are eliminated. Thus the control signal is independent of $\theta$, i.e., is independent of the ratio of channel powers. For example, if $$\tilde{z}(t) = \tilde{z}_1(t) + \tilde{z}_2(t) \text{ then}$$
$$\tilde{z}(t) = \tfrac{1}{4}P_T\sin 2\phi(\cos^2\theta + \sin^2\theta) = \tfrac{1}{4}P_T\sin 2\phi. \qquad (8)$$

Unlike such a novel receiver if a prior art Costas loop were employed, therein $x_1(t)$ and $y_1(t)$ are multiplied to provide the central signal for the loop filter 20. From expression (4) it is seen that $$x(t)\ y(t) = \tfrac{1}{2}\ P_T \cos(2\theta) \sin 2\phi. \quad (9)$$

Thus it is seen that the control signal supplied to the loop filter is a cosine function of $2\theta$. Since $\theta$ is a function of the ratio of the powers of the two channels it is clear that when using a Costas loop, the control signal is a function of the ratio of the powers of the channels, and vanishes completely when $\theta=\pi/2$, i.e., both channels have equal power.

In practice when noise is taken into consideration one can find the best linear combination or weighted summation of $z_1(t)$ and $z_2(t)$ to minimize the variance of the phase error in tracking. An analysis of the tracking loop with noise will now be presented to further highlight the advantages of the present invention over the prior art.

Let it be assumed that the channel adds white Gaussian noise with one-sided spectral density $N_o$. The received signal will be $$r(t) = s(t) + n(t),$$

and the control signals at the output of the lowpass filter ($B_L$) are $$z_1(t) = \tilde{z}_1(t) + n_1(t)$$
$$z_2(t) = \tilde{z}_2(t) + n_2(t) \quad (10)$$

where $n_1(t)$ and $n_2(t)$ are independent noise factors.

Since $B_L << W_a$ and $B_L << W_b$, the effective onesided spectral densities of $n_1(t)$ and $n_2(t)$ in the low frequency band are respectively:

$$N_1 = 1/4\ N_o\ P_T \cos^2\theta + N_o^2 W_a/2$$
$$N_2 = 1/4\ N_o\ P_T \sin^2\theta + N_o^2 W_b/2\ . \quad (11)$$

Let $$z(t) = \gamma z_1(t) + (1-\gamma)\ z_2(t)\ o \leq \gamma \leq 1, \quad (12)$$

where $\gamma$ represents a weight factor.

From (7') and (10), $$z(t) = 1/4\ P_T\ [\gamma \cos^2\theta + (1-\gamma) \sin^2\theta] \sin 2\phi + \tilde{n}(t) \quad (13)$$

where $$\tilde{n}(t) = \gamma n_1(t) + (1-\gamma) n_2(t)$$

is zero mean process with spectral density in the low frequency band $$N = \gamma^2 N_1 + (1-\gamma)^2\ N_2. \quad (14)$$

Assuming that the phase error $\phi$ is small enough that the linear model is a good approximation to the phase locked loop, one obtains the variance of $\phi$ as, $$\sigma_\phi^2 = 1/4\ \sigma^2{}_{2\phi} = 1/4\ N\ B_L/(1/4\ P_T[\gamma\cos^2\theta + (1-\gamma)\sin^2\theta])^2.$$

From (11) and (14)

$$\sigma_\phi^2 = N_o B_L/P_T \cdot \gamma^2\cos^2\theta + (1-\gamma)^2\sin^2\theta + K(\gamma^2 + d(1-\gamma)^2)/[\gamma\cos^2\theta + (1-\gamma)\sin^2\theta]^2 \quad (15)$$

where $$K \triangleq 2N_o W_a/P_T$$

and $$d \triangleq W_b/W_a\ .$$

It is thus seen that the variance of $\phi$, i.e., $\sigma_\phi^2$, depends on $B_L$, $N_o/P_T$, $\theta$, $W_a$, $W_b$ and $\gamma$. $B_L$, $N_o/P_T$, $\theta$, T $W_a$ and $W_b$ are determined by the required system parameters, e.g., the data symbol notes and the data signal-to-noise ratio in the two channels. Thus, assuming these terms to be defined only $\gamma$ can be chosen or optimized to minimize $\sigma_\phi^2$.

Using both $z_1(t)$ and $z_2(t)$ and minimizing $\sigma_\phi^2$ we get get $$\gamma_{opt} = (kd + \sin^2\theta) \cos^2\theta/K \sin^2\theta + d\ K \cos^2\theta + 2 \sin^2\theta \cos^2\theta. \quad (16)$$

Thus, $$\sigma_\phi^2\ (\gamma_{opt}) = N_o B_L/P_T\ (1 + K\ Kd + (1+d)\sin^2\theta\cos^2\theta/K(d \cos^4\theta + \sin^4\theta) + \sin^2\theta\cos^2\theta). \quad (17)$$

For the case where both channels use the same type of code (or are uncoded) and have the same error probabilities, $$d = W_b/W_a = R_b/R_a = P_2/P_1 = \tan^2\theta, \quad (18)$$

where $R_a$, $R_b$ are the bit rates of the two data streams.

In this case, substituting $d$ in (16) and (17) yields:

$$\gamma_{opt} = 1/2. \quad (19)$$

Thus, $$\sigma_\phi^2 = N_o B_L/P_T\ (1 + K \sec^2\theta). \quad (20)$$

It can be shown that the present invention exhibits a loop SNR which is better than that achievable with a Costas loop by a factor of $1/\cos^2\theta$. In the Costas loop, the lowpass filters are selected to pass either $W_a$ or $W_b$. Thus, the control is equal to either $z_1(t)$ (i.e., $\gamma=1$) or $z_2(t)$ (i.e., $\gamma=0$). In such a case $$\sigma_\phi^2 = N_o B_L/P_T \cdot \sec^2\theta\ (1 + K \sec^2\theta)\ . \quad (21)$$

Comparing expressions (20) and (21) it is seen that the loop SNR with the present invention is better by a factor of $1/\cos^2\theta$. In the Costas loop the lowpass filters cannot be chosen to pass both $W_a$ and $W_b$. In such a case the control signal would be equal to $z_1(t) - z_2(t)$ which is worse than choosing either for the control signal.

Although particular embodiments of the invention have been described and illustrated herein, it is recognized that modifications and variations may readily occur to those skilled in the art. For example, tracking may be extended to a system with $N$ channels, where $N$ is more than 2. In such a system $2N$ bandpass filters will be used, each pair of filters centered about the frequency of another subcarrier. Their outputs will be combined to generate $N$, $z$ signals $(z_1 \ldots . z_n)$ which will then be combined to produce the loop filter control signal. Consequently it is intended that the claims be interpreted to cover all such modifications and equivalents.

What is claimed is:

1. In a receiver of a multichannel telemetry system of the type in which data in separate channels phase modulate separate subcarriers and signals of the phase modulated subcarriers are transmitted by a transmitter to the receiver for data detection on a suppressed carrier, a phase lock loop arrangement comprisIng:

an input terminal at which the signal received from said transmitter is applied;

a variable oscillator for providing an output signal at a frequency which is a function of an input signal supplied thereto;

first mixing means for mixing the signal at said input terminal with the oscillator's output signal;

phase shifting means for shifting the phase of the oscillator output signal by 90°;

second mixing means for mixing the signal at said input terminal with the output signal of said phase shifting means;

a loop filter for controlling the input signal to said oscillator; and control means for controlling the input signal to said loop filter as a function of the outputs of said first and second mixing means, said control means including at least two bandpass filters centered at the frequency of one of said subcarriers and at least two bandpass filters centered at the frequency of another of said subcarriers.

2. The arrangement as recited in claim 1 wherein the number of channels is $N$, and said control means includes $2N$ bandpass filters, each two filters being centered at the frequency of a subcarrier of a different of said $N$ channels, said control means further including means responsive to the outputs of said $2N$ filters for generating $N$ control signals and means utilizing said $N$ control signals for providing said input signal to said loop filter.

3. The arrangement as recited in claim 1 wherein said control means include first and second bandpass filters for filtering the output of said first mixing means and third and fourth bandpass filters for filtering the output of said second mixing means, said first and third bandpass filters being centered at the frequency of one of said subcarriers and said second and fourth bandpass filters being centered at the frequency of another of said subcarriers.

4. The arrangement as recited in claim 3 wherein said control means include output means utilizing the outputs of said first, second, third and fourth bandpass filters for providing a control input signal to said loop filter.

5. The arrangement as recited in claim 3 wherein said control means include third mixing means for mixing the outputs of said first and third bandpass filters, and fourth mixing means for mixing the outputs of said second and fourth bandpass filters, and output means responsive to the outputs of said third and fourth mixing means for providing the control input signal to said loop filter.

6. The arrangement as recited in claim 5 wherein said output means include means for weighting the outputs of said third and fourth mixing means and for summing the weighted outputs of said third and fourth mixing means to provide the control input signal to said loop filter.

7. In a receiver of a two-channel phase shift keying phase modulation telemetry system in which data is transmitted to a receiver as a signal including phase modulated first and second subcarriers of different frequencies, a phase lock loop comprising:

a loop filter;

a voltage controlled oscillator for providing an output signal as a function of the voltage signal from said loop filter;

a 90° phase shifter for shifting the oscillator output signal by 90°;

first and second mixer for mixing the received signal with the oscillator output signal and with the output of the phase shifter, respectively;

first and second bandpass filters for filtering the output of said first mixer;

third and fourth bandpass filters for filtering the output of said second mixer, each of said first and third bandpass filters having substantially the same bandwidth and each of said second and fourth bandpass filters having substantially the same bandwidth; and control means for controlling the input to said loop filter as a function of the outputs of said first, second, third and fourth bandpass filters.

8. The arrangement as recited in claim 7 wherein the bandwidth of said first and third bandpass filters definable as $W_a$ is centered about the frequency of said first subcarrier and the bandwidth of said second and fourth bandpass filters definable as $W_b$ is centered about the frequency of said second subcarrier.

9. The arrangement as recited in claim 8 wherein $W_a$ passes the data which phase modulated said first subcarrier around the first harmonic of the first subcarrier, and $W_b$ passes the data which phase modulated said second subcarrier around the first harmonic of the second subcarrier.

10. The arrangement as recited in claim 9 wherein said control means include first means for combining the outputs of said first and third bandpass filters and the outputs of said second and fourth bandpass filters and second means for weighting the combination to provide the input signal to said loop filter.

11. The arrangement as recited in claim 10 wherein said first means comprise a third mixer for mixing the outputs of said first and third bandpass filters and a fourth mixer for mixing the outputs of said second and fourth bandpass filters.

* * * * *